United States Patent [19]
Carati et al.

[11] Patent Number: 5,981,419
[45] Date of Patent: Nov. 9, 1999

[54] DIFUNCTIONAL CATALYST EFFECTIVE IN WAX HYDROISOMERIZATION AND PROCESS FOR PREPARING IT

[75] Inventors: Angela Carati, San Giuliano Milanese; Cristina Flego, Trieste; Vincenzo Calemma, San Donato Milanese, all of Italy

[73] Assignees: Eniricerche S.p.A., San Donato Milanese; Agip Petroli S.p.A., Rome, both of Italy

[21] Appl. No.: 09/197,698

[22] Filed: Nov. 23, 1998

Related U.S. Application Data

[62] Division of application No. 08/975,276, Nov. 20, 1997, Pat. No. 5,908,968, which is a continuation of application No. 08/604,190, Feb. 21, 1996, abandoned, which is a continuation of application No. 08/275,413, Jul. 15, 1994, abandoned.

[30] Foreign Application Priority Data

Jul. 23, 1993 [IT] Italy ................................. MI43A1641

[51] Int. Cl.⁶ ............................. B01J 29/86; B01J 29/064
[52] U.S. Cl. ................................. 502/66; 502/67; 502/74; 423/328.2; 423/700
[58] Field of Search ................................ 502/66, 67, 74, 502/327; 423/700, 328.2

[56] References Cited

U.S. PATENT DOCUMENTS

| | | | |
|---|---|---|---|
| 4,584,087 | 4/1986 | Unmuth et al. | 208/65 |
| 5,198,597 | 3/1993 | O'Yourg et al. | 585/654 |
| 5,302,279 | 4/1994 | Degnan et al. | 208/87 |
| 5,393,407 | 2/1995 | Zones et al. | 208/46 |

FOREIGN PATENT DOCUMENTS

| | | |
|---|---|---|
| 0 095 303 | 11/1983 | European Pat. Off. . |
| 0 188 913 | 7/1986 | European Pat. Off. . |
| 0 438 818 | 7/1991 | European Pat. Off. . |
| WO 91/00777 | 1/1991 | WIPO . |

*Primary Examiner*—Bekir L. Yildirim
*Attorney, Agent, or Firm*—Oblon, Spivak, McClelland, Maier & Neustadt, P.C.

[57] ABSTRACT

Process for the hydroisomerization of n-paraffins in the presence of a difunctional catalyst which comprises:

(a) a porous crystalline material isostructural with beta-zeolite selected from boro-silicate (BOR-B) and boro-alumino-silicate (AL-BOR-B) in which the molar $SiO_2:Al_2O_3$ ratio is higher than 300:1;

(b) one or more metal(s) belonging to Group VIIIA, selected from platinum and palladium, in an amount comprised within the range of from 0.05 to 5% by weight.

4 Claims, No Drawings

DIFUNCTIONAL CATALYST EFFECTIVE IN WAX HYDROISOMERIZATION AND PROCESS FOR PREPARING IT

This application is a division of application Ser. No. 08/975,276 filed on Nov. 20, 1997, now U.S. Pat. No. 5,908,968, which is a Continuation of Ser. No. 08/604,190, filed Feb. 21, 1996, abandoned, which is a continuation of Ser. No. 08/275,413 filed Jul. 15, 1994, abandoned.

The present invention relates to a difunctional catalyst constituted by a boro-silicate or a boro-alumino-silicate isostructural with beta-zeolite and one or more metal(s) belonging to Group VIIIA, to its preparation and to its use in the hydroisomerization of long chain n-paraffins having more than 15 carbon atoms.

The process of wax isomerization to yield base stocks for lubricant oils characterized by a Low pour point and a high viscosity index requires the use of suitable catalysts.

In fact, waxes, mainly constituted (>80% by weight) by n-paraffins having more than 15 carbon atoms, which are solid at room temperature, must be converted into their corresponding branched isomers, having lower melting point than the linear isomer.

In fact, $n-C_{16}$ paraffins has a melting point of 19° C., whilst its 5-methyl-pentadecane isomer melts at −31° C.

However, an effective hydroisomerization catalyst should minimize the possible cracking and hydrocracking reactions, which are catalyzed by the same acidic sites and have, as intermediates, the same carbocations which are useful for hydroisomerization. These secondary reactions cause the degradation of the molecule with lighter, less valuable, products being formed, which must be removed from the end product because they increase the volatility thereof; this requirement obviously constitutes a burden for the overall process.

For this process, difunctional catalysts have been developed, i.e., catalysts which display both acidic sites and hydro-dehydrogenation active sites. The acidity of the catalyst depends on the selected type of amorphous or crystalline carrier for it, and the function thereof precisely is the isomerizing activity.

The hydro-dehydrogenating activity is given to the catalyst by the deposited metal phase, the function of which is also of minimizing cracking.

It was demonstrated (J. F. Le Page, Applied Heterogeneous Catalysis, Ed. Technip, Paris, 1987, 435–466) that, with the hydrogenating activity being the same, the most selective catalysts are those in which the carrier has a controlled acidity, so as to maximize n-paraffin isomerization, relatively to cracking. However, inasmuch as the cracking reactions follow the isomerization reactions, the maximal isomerization selectivity is obtained at low conversion levels (G. Froment et al., Ind. Eng. Chem. Prod. Res. Dev., 1981, 20, 654–660). In general, the wax conversion rates are limited to values of 20–40% by weight, in order to minimize the formation of light products caused by the cracking reactions.

The effectiveness of various catalysts can be evaluated on model compounds, as n-paraffins, by measuring the selectivity to isomerization products for a given n-paraffin conversion rate.

The use of zeolites functionalized with metals of Group VIII for the hydroisomerization of waxes in order to produce base stocks for lubricant oils has been reported many times. For example, EP-A-440,540 claims the use of omega zeolite, EP-A-431,448 of ZSM-5, U.S. Pat. No. 4,541,919 claims the use of X, Y zeolites exchanged with alkaline-earth metals.

U.S. Pat. No. 4,419,220; U.S. Pat. No. 4,518,485; U.S. Pat. No. 4,975,177; U.S. Pat. No. 4,554,065; EP-A-464,546; U.S. Pat. No. 4,788,378 claim the use of variously modified beta zeolite, as it will be disclosed hereinunder, plus a hydro-dehydrogenating component.

Zeolites with beta structure can be prepared as alumino-silicates (U.S. Pat. No. 3,308,069); as boro-silicates (Bel. Pat. 877,205; U.S. Pat. No. 5,110,570), or as boro-alumino-silicates (EP-A-172,715; U.S. Pat. No. 5,110,570).

In the hydrothermal synthesis, the alumino-silicate with beta structure can be obtained with a maximal molar $SiO_2:Al_2O_3$ ratio of 100:1, as disclosed in U.S. Pat. No. 4,518,485, column 7, line 12.

Aluminum present in zeolitic structures is known to be responsible for the formation of acidic sites. From the above patents, such sites result to be necessary in order to favour the isomerization reaction, but should a too large number of them be present, they would favour undesired cracking reactions.

Due to this reason, the prior art claims the use of beta zeolites with controlled acidity, with said control being performed on the number of acidic sites, i.e., on the amount of aluminum contained in the catalyst.

Such a parameter can be modified according to two different approaches:

(1) Removal of aluminum by acid extraction and/or heat treatment in the presence of steam, as disclosed in U.S. Pat. No. 4,419,220; U.S. Pat. No. 4,518,485; U.S. Pat. No. 4,975,177; U.S. Pat. No. 4,554,065. In that way, molar ratios higher than 100:1, or even as high as 250:1 or 500:1, can be obtained.

(2) Hydrothermal synthesis of boro-alumino-silicate with beta structure.

The partial replacement of aluminum by boron makes it possible beta zeolite with a higher molar $SiO_2:Al_2O_3$ ratio to be synthesized. In order to obtain materials the acidity of which has been reduced to a low enough level, i.e., such as to favour isomerization instead of cracking, the need remains however for the material obtained by direct synthesis to be further modified, either by reducing the level of aluminum contained in it by steaming (EP-A-464,546) or replacing boron by means of a treatment with $SiCl_4$ (U.S. Pat. No. 4,788,378).

Summing-up, on the basis of the prior art, beta zeolite results to be active in the isomerization reaction and, as such, can be used in the presence of a hydro-dehydrogenating function in the hydroisomerization of n-paraffins. Its isomerizing activity is given by the presence of the acidic sites generated by the aluminum atoms contained in its framework. The number of such sites has an influence on the selectivity of the isomerization reaction, at the detriment of the undesired cracking raction.

The need for limiting the number of acidic sites present in the material implies a considerable burden in terms of preparation steps and catalyst cost.

The only declared usefulness of boron introduction claimed in U.S. Pat. No. 4,788,378 and EP-A-464,546 is of making possible the aluminum entered during the step of hydrothermal synthesis to be reduced, with further steps for material modifications remaining anyway necessary. On the basis of the prior art, no catalytic activity can be anticipated in the reaction taken into consideration for boron, the removal of which, to the contrary, appears to be useful (U.S. Pat. No. 4,788,378).

The present invention relates to a process for preparing a catalyst which is effective in the hydroisomerization of waxes, which catalyst does not display the drawbacks which affect the prior art, i.e., it does not require any further treatments, such as aluminum removal or boron replacement.

On the contrary, the present Applicant unexpectedly found that when a beta zeolite is used in which all aluminum was replaced by boron during the hydrothermal synthesis (BOR-B, according to Bel. Pat. 877,205), plus one effective component in hydrodehydrogenation, high isomerization selectivities are obtained, with the activity of the material towards cracking resulting to be very low.

Traces of aluminum can be entered during the hydrothermal synthesis with a good selectivity material was still obtained, provided that the molar $SiO_2:Al_2O_3$ ratio is higher than 300:1. Such materials obtained by direct synthesis do not require any subsequent treatment aiming at removing aluminum or anyway reducing the number of acidic sites, with the preparation process being considerably simplified.

The end synthesized products display alpha-test values comprised within the range of from 1 to 5.

In accordance therewith, the present invention relates to a process for the hydroisomerization of n-paraffins having more than 15 carbon atoms, characterized in that n-paraffin, or the mixture of n-paraffins, is brought into contact, under hydroisomerization conditions, with a difunctional catalyst which comprises:

(a) a porous crystalline material isostructural with beta-zeolite selected from boro-silicate (BOR-B) and boro-alumino-silicate (AL-BOR-B) in which the molar $SiO_2:Al_2O_3$ ratio is higher than 300:1, preferably higher than 500:1;

(b) one or more metal(s) belonging to Group VIIIA, preferably selected from platinum and palladium, in an amount comprised within the range of from 0.05 to 5% by weight, preferably from 0.1 to 1% by weight.

A further object of the present invention is a process for preparing the catalyst useful in the hydroisomerization process disclosed above.

Such a process consists of two steps, the first of which relates to the preparation of BOR-B or AL-OR-B isostructural with beta zeolite, the second one relates to the impregnation of said porous crystalline material with a metal belonging to Group VIIIA.

In accordance therewith, the process for preparing the catalyst to be used in the hydroisomerization process comprises:

(1) a first step, of preparation of the porous crystalline material which is isostructural with beta zeolite, selected from boro-silicate and boro-alumino-silicate;

(2) a second step, in which the zeolite obtained from the (a) step is treated with a metal from Group VIIIA.

The first step, as disclosed in U.S. Pat. No. 5,110,570 consists in preparing a mixture containing a silica source, a boron source, an alkali metal hydroxide (MEOH), a tetra alkyl ammonium salt ($R^+$), distilled water and optionally, an aluminum source, so that the molar composition of the mixture, expressed as oxides, is the following:

* $SiO_2/B_2O_3>1$;
* $R/SiO_2=0.1–1.0$;
* $ME/SiO_2=0.01–1.0$;
* $H_2O/SiO_2=5–80$;

and, in the case of boro-alumino-silicates:

* $SiO_2/Al_2O_3>300$, preferably>500.

To such a mixture, an aliquot of from 1 to 60% of crystallization seeds can possibly be added, which seeds have the same composition and have been previously submitted to partial crystallization under hydrothermal conditions under the autogenous pressure of the reaction mixture, at a temperature comprised within the range of from 90 to 160° C., during a period of at least one day.

The resulting mixture is heated in an autoclave, under hydrothermal conditions, under autogenous pressure, at a temperature comprised within the range of from 90 to 160° C.

The crystallization time is comprised within the range of from 1 to 7 days, with it being shorter in the presence of seeds.

At the end of the process, the reaction mixture is discharged from the autoclave, the crystalline material is recovered by filtration, is washed with distilled water and is dried at 120° C. for some hours. The resulting product is submitted to ion exchange in order to be turned into its acidic form, according to the processes known from the prior art.

The silica source which can be used in the process according to the present invention can be selected from colloidal silica, silica gel, sodium silicate, and so forth, preferably colloidal silica; the boron source is selected from boric acid, alkaline borates, trialkyl borates, and so forth, with boric acid being preferred. As the organic template, a tetra alkyl ammonium salt, preferably tetra ethyl ammonium hydroxide, is used.

The zeolite in acidic form obtained in that way is then submitted (step 2) to a process which makes it possible it to be at least partially coated with a metal from Group VIIIA, preferably palladium or platinum.

Said second step can be carried out by impregnation from an aqueous medium, or by ion exchange, preferably by impregnation.

According to the impregnating technique, the zeolite obtained from the first step is wetted with an aqueous solution of a metal compound, e.g., chloroplatinic acid or $Pd(NH_3)_4(NO_3)_2$, by operating either at room temperature, or at close-to-room temperatures.

After the aqueous impregnation, the solid material is dried, preferably in air, at room temperature, or at close-to-room temperatures, and is submitted to thermal treatment under an oxidizing atmosphere, preferably air. Suitable temperatures for for this heat treatment are comprised within the range of from 200 to 600° C. The conditions are so adjusted as to deposit on the particles (prepared as disclosed in step 1), a metal amount which is comprised within the range of from 0.05 to 5%, preferably of from 0.1 to 2%.

According to the ion exchange technique, the zeolite obtained from the step 1 is suspended in an aqueous solution of a noble metal complex or salt, e.g., an aqueous solution of $Pt(NH_3)_4(OH)_2$, $Pt(NH_3)_4Cl_2$, $Pd(NH_3)_4(NO_3)_2$, operating either at room temperature or to close-to-room temperatures. After the ion exchange the resulting solid material is separated, washed with water, dried and finally submitted to thermal treatment under an inert and/or oxidizing atmosphere. Heat treatment temperatures comprised within the range of from 200 to 600° C. have been found to be useful for the intended purpose. The conditions are so adjusted as to deposit on treated zeolite particles a metal amount which is comprised within the range of from 0.05 to 5% by weight, preferably of from 0.1 to 2%.

The catalysts according to the present invention can be used as such, or in combination with suitable inert, solid material acting as binders.

Oxides of the type of silica, alumina, titania, magnesia and zirconia, which may be taken either individually or combined with each other, result to be suitable. The catalyst and the binder can be mixed in a mutual ratio, by weight, comprised within the range of from 30:70 to 90:10, and preferably of from 50:50 to 70:30. Both components can be compacted giving them a desired end shape, e.g., as extrudates, or pellets.

The catalysts obtained from the process according to the present invention can be activated by drying and/or reduction, preferably by drying and subsequent reduction. The drying is carried out under an inert atmosphere at temperature comprised within the range of from 100 to 400° C., and the reduction is accomplished by submitting the sample to thermal treatment under a reducing atmosphere, at a temperature comprised within the range of from 150 to 500° C.

The catalyst prepared according to the above techniques, is active in the hydroisomerization process, which can be carried out either continuously or batchwise.

The hydroisomerization is suitably carried out in the presence of $H_2$, at a temperature comprised within the range of from 200 to 540° C., preferably of from 250 to 450° C., and under a pressure of from atmospheric pressure up to 25,000 kPa, and preferably of from 4,000 to 10,000 kPa.

The effective catalyst amount, as expressed as weight percentage based on n-paraffins or n-paraffin mixtures to be hydroisomerized, is generally comprised within the range of from 0.5 to 30% by weight, preferably of from 1 to 15% by weight.

The following experimental examples are reported in order to better illustrate the present invention.

EXAMPLE 1

(Catalyst 1)

This boro-silicate is disclosed in BE-877,205. 3.0 grams of NaOH and 6.4 grams of boric acid are dissolved in 28.1 g of an aqueous solution at 40% of tetra ethyl ammonium hydroxide. A clear solution is obtained which is diluted with 30.0 g of distilled water and is added to 51.0 g of Ludox AS silica, containing 30% by weight of silica.

The resulting suspension, having a pH value of 12.2, is kept stirred at room temperature for 4 hours and is then charged to an autoclave in order to crystallize under static conditions, under its autogenous pressure, at 150° C. for 7 days.

At the end of this time period, the resulting product is discharged, washed and dried.

The material was characterized by X ray analysis, with the structure of a pure BOR-B being evidenced.

The product is calcined at 550° C. for 5 hours, is exchanged into its acidic form by treatment with a solution of ammonium acetate and subsequent calcination under the above indicated conditions.

The resulting material displays a molar ratio of $SiO_2:B_2O_3=45$ and, when it was tested in the cracking reaction with n-hexane, it yielded an alpha value equal to 1.

The Pt metal phase is deposited onto the beta zeolite by aqueous impregnation.

In particular, on 10 g of beta zeolite, prepared as disclosed above, charged to a crystallizer, 12.6 mL of an aqueous solution containing $H_2PtCl_6$ (0.45% by weight/volume) and (0.6M) HCl is added dropwise, mixing accurately. The reactants are allowed to stay into contact for 16 hours, water is then evaporated off by heating at 60° C. for 1 hour, and the sample is subsequently dried for 2 hour at 150° C., still in air. The calcination is carried out at 500° C. for 3 hours under a flowing air stream, with the muffle being heated from 23 to 500° C. during 90 minutes.

EXAMPLE 2

(Catalyst 2)

A suspension of seeds for the synthesis of Al-BOR-B is prepared by operating according to as disclosed in U.S. Pat. No. 5,110,570, as follows:

Four grams of NaOH and 8 grams of boric acid are dissolved in 30 g of distilled water. To this solution, 35 g of tetra ethyl ammonium hydroxide at 40% in water and 0.2 g of $Al(NO_3)_3.9H_2O$ previously dissolved in 10 g of water, are added. The end solution obtained in that way is added to 64 g of Ludox AS silica, at 30% by weight.

A mixture "A" is obtained which is allowed to stay at room temperature during about 4 hours, and is then charged to an autoclave and is caused to crystallize at 150° C. for 5 days, under static conditions and under its autogenous pressure.

Twenty-six grams of so prepared seed suspension is added to 155 g of a mixture having the same composition as of mixture A.

After a 3-day crystallization at 150° C., with stirring, under the autogenous pressure, an aluminum-containing BOR-B is obtained. After being exchanged into its acidic form the product displays an alpha value =4. Its composition is as follows:

* $SiO_2/Al_2O_3=698$;
* $SiO_2/B_2O_3=41$.

The so prepared boro-alumino-silicate is submitted to the platinum impregnation step as disclosed in above Example 1.

COMPARISON EXAMPLE 3

(Catalyst 3)

A reactant mixture "A" is prepared by dissolving 0.8 g of NaOH, 0.4 g of $NaAlO_2$ and 3.7 g of $H_3BO_3$ in 65.5 g of tetra ethyl ammonium hydroxide at 14% by weight. To the resulting clear solution, 31.2 g of Ludox HS silica at 40% by weight is added. The resulting "A" mixture is charged to an autoclave and is allowed to crystallize for 2 days at 150° C. under static conditions and under its autogenous pressure. In that way, a milky seed suspension is obtained.

Twenty-four grams of this milky seed suspension is added to 130 g of a mixture having the same composition as of "A" mixture. The resulting suspension is allowed to crystallize at 150° C., under its autogenous pressure, under static conditions, for 2 days.

After being submitted to exchange into its acidic form, the product has the following molar composition:

* $SiO_2/B_2O_3=43$;
* $SiO_2/Al_2O_3=90$.

The resulting AL-BOR-B is impregnated with platinum, by operating according to the same process as disclosed in above Example 1.

COMPARISON EXAMPLE 4

(Catalyst 4)

A beta-zeolite is prepared under similar conditions to as disclosed in U.S. Pat. No. 3,308,069.

An amount of 59.8 g of tetraethylammonium hydroxide (TEA-OH) at 40% by weight/weight in aqueous solution and 1.9 g of sodium aluminate are added to 58.4 g of demineralized water. The resulting mixture is heated up to about 80° C. and is kept with stirring, until $NaAlO_2$ is completely dissolved. The obtained solution is added to 48.7 g of Ludox NS colloidal silica at 40% by weight, such as to yield a molar ratio of $SiO_2:Al_2O_3=28$.

The resulting homogeneous suspension having pH=14 is charged to a stainless steel autoclave and is allowed to crystallize under hydrothermal conditions, in an oven at 150° C. during 10 days, under static conditions and under its autogenous pressure. The crystallized product, which results to be a pure beta-zeolite, is filtered off, is washed, is dried at 120° C. during 1 hour, is calcined at 550° C. during 5 hours and is exchanged into its acidic form by exchange with ammonium acetate and subsequent calcination under the above indicated conditions.

The Pt metal phase is deposited on beta-zeolite by aqueous impregnation, as disclosed in Example 1.

EXAMPLE 5

The catalyst from Example 1 was tested in the reaction of n-$C_{16}$ paraffin hydroisomerization, inside a microautoclave under the following conditions.

The microautoclave is constituted by a steel body and a lid provided with a plurality of valves for autoclave pressurizing, venting and possible recovery of gas products, and with a safety (pressure relief) disk. The stirring system consists of a thin inner metal rod.

The reactor is charged with 8 g of $C_{16}$ paraffin and 0.25 g of catalyst; the system is pressurized, when cold, at 5 MPa with $H_2$, and is then heated up to 360° C.

Zero time is assumed to be that time point at which the temperature inside the reactor reaches the desired value. When 120 minutes have elapsed, the reactor is cooled and depressurized, and the reaction mixture is then recovered.

The analysis of the product in order to determine the conversion rate and the product distribution is directly carried out on the resulting mixture by gas-chromatography (HP-1 crosslinked methyl silicone gum column, atomic emission detector).

In Table 1, the values of conversion and selectivity are reported, which are computed as follows:

$$\text{n-}C_{16} \text{ conversion} = 1 - \frac{\text{unreacted n-}C_{16} \text{ surface area}}{\text{total hydrocarbons surface area}}$$

$$\text{Selectivity to iso-}C_{16} = \frac{\text{iso-}C_{16} \text{ products surface area}}{\text{total products surface area}}$$

in which "iso-$C_{16}$" is the mixture of isomers with 16 carbon atoms.

EXAMPLE 6

A catalyst according to Example 1 is tested in the hydroisomerization of n-$C_{16}$ paraffin. The conditions are kept equal to those as of Example 5, but for temperature, which is decreased down to 350° C. The values of conversion and selectivity are reported in Table 1.

EXAMPLE 7

A catalyst according to Example 1 is tested in the hydroisomerization of n-$C_{16}$ paraffin. The conditions are kept equal to those as of Example 5, but for temperature, which is decreased down to 340° C. The values of conversion and selectivity are reported in Table 1.

EXAMPLE 8

A catalyst according to Example 2 is tested in the hydroisomerization of n-$C_{16}$ paraffin. The conditions are kept equal to those as of Example 5. The values of conversion and selectivity are reported in Table 1.

EXAMPLE 9

A catalyst according to Example 2 is tested in the hydroisomerization of n-$C_{16}$ paraffin. The conditions are kept equal to those as of Example 5, but for the reaction time, which is reduced down to 60 minutes. The values of conversion and selectivity are reported in Table 1.

EXAMPLE 10

A catalyst according to Example 2 is tested in the hydroisomerization of n-$C_{16}$ paraffin. The conditions are kept equal to those as of Example 5, but for temperature, which is decreased down to 350° C. The values of conversion and selectivity are reported in Table 1.

EXAMPLE 11

A catalyst according to Example 2 is tested in the hydroisomerization of n-$C_{16}$ paraffin. The conditions are kept equal to those as of Example 5, but for temperature, which is decreased down to 340° C. The values of conversion and selectivity are reported in Table 1.

EXAMPLE 12

A catalyst according to Example 2 is tested in the hydroisomerization of n-$C_{16}$ paraffin. The conditions are kept equal to those as of Example 5, but for temperature, which is decreased down to 300° C. The values of conversion and selectivity are reported in Table 1.

COMPARISON EXAMPLE 13

A catalyst according to Example 3 is tested in the hydroisomerization of n-$C_{16}$ paraffin. The conditions are kept equal to those as of Example 6. The values of conversion and selectivity are reported in Table 1.

COMPARISON EXAMPLE 14

A catalyst according to Example 4 is tested in the hydroisomerization of n-$C_{16}$ paraffin. The conditions are kept equal to those as of Example 6. The values of conversion and selectivity are reported in Table 1.

COMPARISON EXAMPLE 15

A catalyst according to Example 4 is tested in the hydroisomerization of n-$C_{16}$ paraffin. The conditions are kept equal to those as of Example 5, but for temperature, which is decreased down to 300° C. The values of conversion and selectivity are reported in Table 1.

TABLE 1

| Example | Catalyst | Temperature T, °C. | Time t, minutes | Conversion | Selectivity to iso-$C_{16}$% |
|---|---|---|---|---|---|
| 5 | 1 | 360 | 120 | 65.1 | 88.3 |
| 6 | 1 | 350 | 120 | 48.7 | 95.9 |
| 7 | 1 | 340 | 120 | 35.6 | 95.7 |
| 8 | 2 | 360 | 120 | 98.6 | 70.8 |
| 9 | 2 | 360 | 60 | 52.4 | 93.1 |
| 10 | 2 | 350 | 120 | 89.0 | 76.0 |
| 11 | 2 | 340 | 120 | 75.4 | 89.3 |
| 12 | 2 | 300 | 120 | 17.5 | 98.9 |
| 13 | 3 | 350 | 120 | 99.6 | 26.8 |
| 14 | 4 | 350 | 120 | 99.5 | 21.2 |
| 15 | 4 | 300 | 120 | 89.8 | 26.1 |

Reaction conditions:
$P_{H2}$ = 5 MPa;
n-$C_{16}$:catalyst = 8:0.25.

From Example 5, one may see that the catalyst based on BOR-B and Pt displays extremely good values of selectivity to $C_{16}$ isomers at a higher conversion level than those which are usually taken into consideration in technical papers.

From Examples 5, 6 and 7, one may see that the temperature decrease causes a decrease in conversion and an increase in selectivity to $C_{16}$ isomers of up to 96%.

From Examples 5 and 8, one may see that the introduction of small Al amounts inside the structure causes, with the other experimental conditions being the same, an increase in conversion rate, with a consequent decrease in selectivity to $C_{16}$ isomers down to 70%.

From Examples 8 and 9, one may see that the decrease in reaction time halves the conversion rate, with the selectivity to useful products being increased up to 93%.

From Examples 8, 10, 11 and 12, one may see that at too low reaction temperatures (300° C.), the conversion rate decreases down to lower values that 20%, whereas at intermediate temperatures (340° C.), a good ratio of conversion values (75%) to the values of selectivity to $C_{16}$ isomers (90%) is obtained.

From Examples 6, 10, 13 and 14, one may see that zeolites with beta structure, or BOR-B with too high Al contents and not submitted to aluminum removal treatments display, with the other experimental conditions being the same, very low selectivity values, in the presence of nearly quantitative conversion levels.

Even if the reaction temperature is decreased down to 300° C. (Example 15), the values of conversion and selectivity to useful products are not substantially modified.

We claim:

1. Difunctional catalyst which comprises:

(a) a porous crystalline material isostructural with beta-zeolite selected from boro-silicate (BOR-B) and boro-alumino-silicate (AL-BOR-B) in which the molar $SiO_2Al_2O_3$ ratio is equal to or higher than 698:1;

(b) one or more metal(s) belonging to Group VIIIA, in an amount within the range of from 0.05 to 5% by weight, wherein when the beta-zeolite is the boro-silicate (BOR-B), the group VIIIA metal is platinum.

2. Difunctional catalyst according to claim 1, wherein the one or more metal(s) belonging to Group VIIIA, is present in an amount within the range of from 0.1 to 2% by weight.

3. Process for preparing the catalyst according to claim 1, which comprises:

(1) preparing the porous crystalline material which is isostructural with beta zeolite, selected from boro-silicate (BOR-B) and boro-alumino-silicate (AL-BOR-B) in which the molar $SiO_2:Al_2O_3$ ratio is equal to or higher than 698:1;

(2) treating the zeolite obtained from (1) with a metal from Group VIIIA, with a technique selected from the group consisting of ion exchange and impregnation.

4. Process according to claim 3, characterized in that said (b) step is carried out according to the impregnation technique.

* * * * *

UNITED STATES PATENT AND TRADEMARK OFFICE
CERTIFICATE OF CORRECTION

PATENT NO. : 5,981,419

DATED : November 9, 1999

INVENTOR(S): Angela CARATI, et al

It is certified that an error appears in the above-identified patent and that said Letters Patent is hereby corrected as shown below:

On the title page, item [30] should be:

--[30]  Foreign Application Priority Data

Jul. 23, 1993  [IT]    Italy........................MI93 A 001641

Signed and Sealed this

Eleventh Day of July, 2000

Attest:

Q. TODD DICKINSON

*Attesting Officer*  *Director of Patents and Trademarks*